(12) United States Patent
Sidhu

(10) Patent No.: US 8,461,785 B2
(45) Date of Patent: Jun. 11, 2013

(54) SPEED CONTROLLER FOR ELECTRIC MOTOR

(76) Inventor: Dalwinder Singh Sidhu, Old Bridge, NJ (US)

( * ) Notice: Subject to any disclaimer, the term of this patent is extended or adjusted under 35 U.S.C. 154(b) by 282 days.

(21) Appl. No.: 12/881,380

(22) Filed: Sep. 14, 2010

(65) Prior Publication Data

US 2012/0063750 A1     Mar. 15, 2012

(51) Int. Cl.
*H02P 8/14*     (2006.01)

(52) U.S. Cl.
USPC .......................................................... 318/257

(58) Field of Classification Search
USPC .......................................................... 318/257
See application file for complete search history.

(56) References Cited

U.S. PATENT DOCUMENTS

| | | | |
|---|---|---|---|
| 3,278,821 A | 10/1966 | Gutzwiller | |
| 3,518,521 A | 6/1970 | Gladieux | |
| 3,710,213 A * | 1/1973 | Hansen | 388/811 |
| 3,912,162 A * | 10/1975 | Bauer et al. | 236/11 |
| 3,988,656 A | 10/1976 | Schnizler, Jr. et al. | |
| 4,176,307 A * | 11/1979 | Parker | 318/798 |
| 4,384,243 A | 5/1983 | Muskovac | |
| 4,574,226 A | 3/1986 | Binder | |
| 4,823,054 A | 4/1989 | Millauer | |
| 4,999,552 A | 3/1991 | Seipelt | |
| 5,388,176 A | 2/1995 | Dykstra et al. | |
| 5,440,215 A | 8/1995 | Gilmore | |
| 6,060,850 A | 5/2000 | Sakabe | |
| 6,424,112 B1 | 7/2002 | Schauer | |
| RE38,486 E | 4/2004 | Sakabe | |
| 6,873,124 B2 | 3/2005 | Kawano et al. | |
| 6,911,793 B2 | 6/2005 | Fritsch et al. | |
| 7,121,773 B2 | 10/2006 | Mikiya et al. | |
| 7,274,866 B2 | 9/2007 | Rudolf et al. | |
| 7,504,791 B2 | 3/2009 | Sieber et al. | |
| 2005/0025586 A1 | 2/2005 | Mikiya et al. | |

* cited by examiner

*Primary Examiner* — Thomas Dougherty

(74) *Attorney, Agent, or Firm* — Arthur Peslak; Gertner Mandel & Peslak

(57) ABSTRACT

A speed controller for a small electric motor is described. The controller is used to control small electric motors such as those used in small power tools such as electric screwdrivers. A series of electrical components are used to allow the motor to remain idle until a load is applied to the motor. When a load is applied to the motor, it increases in speed quickly to its maximum speed and remains there until the load is removed from the motor.

1 Claim, 1 Drawing Sheet

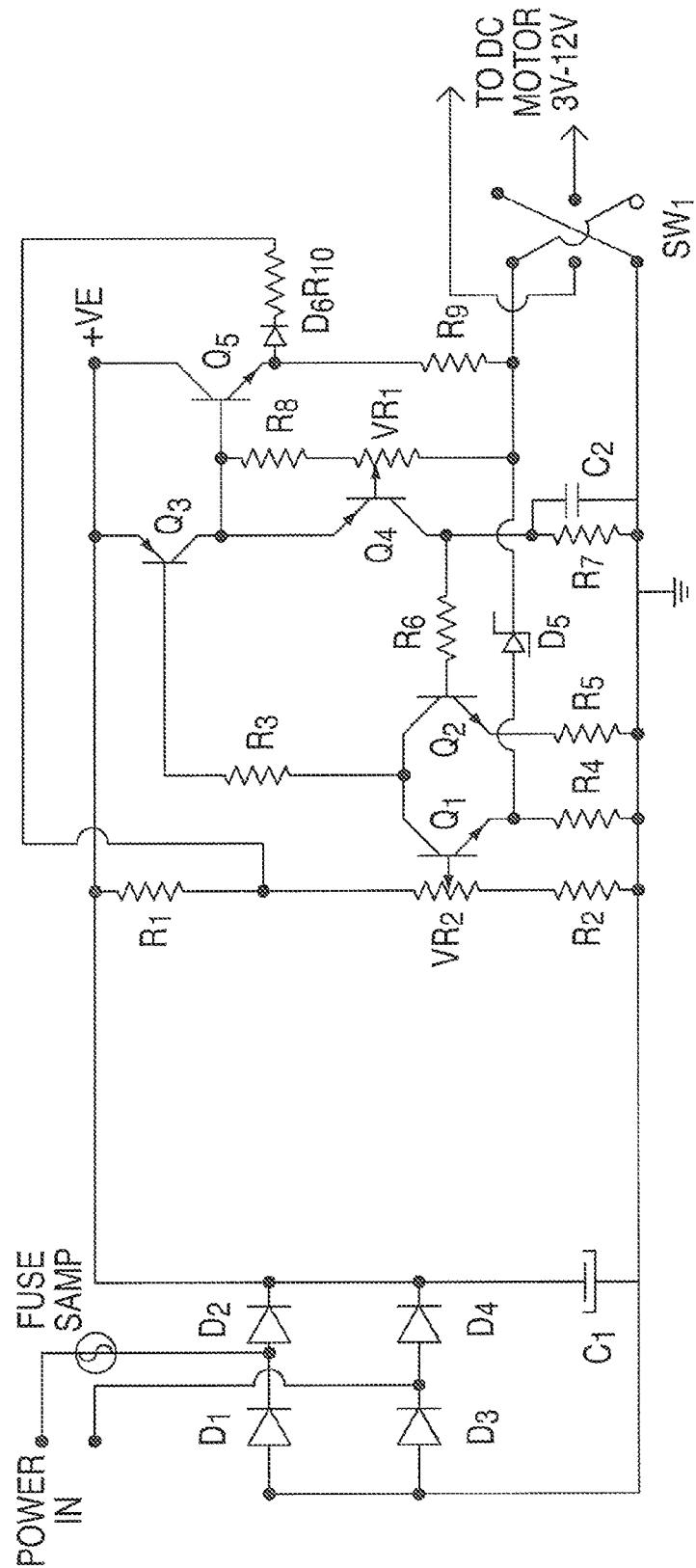

SPEED CONTROLLER FOR ELECTRIC MOTOR

BACKGROUND OF THE INVENTION

The present invention is directed to the field of devices driven by small electric motors such as power tools. The present invention can also be applied to other fields of endeavor such as power windows in automobiles, windshield wiper motors, power steering pumps, etc. In all of these applications, an electric motor must be available to respond immediately to the application of a load to the motor. Thus, the present invention can be applied in a variety of applications.

The present invention provides a motor controller that allows the motor to remain at idle with a very low power consumption. However, upon application of a load to the motor, the motor begins to increase in speed proportional to the applied load. Prior to the present invention, the available motor controls that can be applied in this manner suffer from various defects including being complicated to implement and expensive to manufacture. The primary objective of the present invention is to provide a simple, cost-effective solution to the defects of available motor controllers.

SUMMARY OF THE INVENTION

An electric motor and speed controller comprising a power source that provides electrical current to the electric motor; a plurality of non-polarity bridge diodes connected to the power source, a power transistor for amplifying the electrical current to the electric motor, a first transistor for driving the power transistor, a second transistor and zener diode for controlling the power transistor so that the power transistor creates an output voltage; and a first resistor that senses the current through the motor by generating a voltage drop and feeding power to the first transistor by means of a second resistor whereby as the load increases across the electric motor more power is delivered to the electric motor which causes the electric motor to speed up in proportion to the applied load.

BRIEF DESCRIPTION OF THE DRAWINGS

FIG. 1 is an electrical schematic diagram illustrating the present invention.

DETAILED DESCRIPTION OF THE INVENTION

The present invention will now be described in terms of the presently preferred embodiment as illustrated in the drawing. This description should not be construed as limiting the scope of the appended claims.

The electric motor controller of the present invention is illustrated in schematic form in FIG. 1. The electrical components set forth in FIG. 1 are identified in Table 1 herein.

In this case, the electric motor is a 3 to 12V DC motor. The current required by the motor is in the range of 0.5 to 2 amp. This type of electric motor is typical of the small electric motors used in small power tools such as electric screwdrivers.

The power into the controller is in the approximate range of 12-18 volts. The power may be of either AC or DC polarity. The power in is connected to Bridge Diodes $D_1$ to $D_4$ so power can be connected in any way. The transistor $Q_5$ is a power transistor that is used in an emitter follower configuration. Transistor $Q_5$ is used to amplify the current required to operate the electric motor. The transistor $Q_3$ is a driver which drives $Q_5$. It is controlled by Transistor $Q_1$ and Zener Diode $D_5$. When transistor $Q_1$ is in a forward position, it allows $Q_3$ to conduct until Zener Diode $D_5$ stops the conduction of $Q_1$. Whatever voltage is created by $D_5$, the output voltage will be equal to the electric motor's minimum idle voltage.

The resistor $R_9$ is a current sensing element. Whenever a load is applied to the electric motor, the voltage drop across resistor $R_9$ is increased thereby feeding power to transistor $Q_1$ by means of resistor $R_{10}$. This process allows transistor $Q_1$ to conduct more power to equal the load applied to the motor. This process is called load compensation. As the load increases, an increased voltage drop in resistor $R_9$ is created which then makes transistor $Q_4$ conduct. The voltage from transistor $Q_4$ is fed to transistor $Q_2$ which in turn drives transistor $Q_3$. Transistor $Q_3$ then activates transistor $Q_5$. Transistor $Q_4$ will keep conducting until the full load on the electric motor is reached. In this case, full voltage is fed to the electric motor which brings the electric motor to full speed. When the load is removed from the electric motor, transistor $Q_4$ stops conducting which makes transistor $Q_2$ cut off and the electric motor returns to its idle state. The process can be repeated any number of times as required by the load on the motor.

The direction of the electric motor is controlled by switch $SW_1$. The switch $SW_1$ can cause the electric motor to rotate in either a clockwise or counterclockwise direction.

This application can be used as a power screwdriver or nut driver, a window motor driver, a wiper motor driver, a driver for electric power steering or hydroelectric power steering, or any other place where a motor needs to be ever ready and consuming a minimal amount of power.

Table 1 describes the electrical components discussed above as utilized in the presently preferred embodiment of the present invention.

Those of ordinary skill in the art will recognize that the foregoing merely represents an embodiment of the present invention. Many obvious modifications may be made thereto without departing from the spirit or scope of the present invention as set forth in the appended claims.

TABLE 1

| COMPONENTS | | |
|---|---|---|
| RESISTORS (R) | R1 | 220 KΩ ¼ Watt |
| | R2 | 21 KΩ ¼ Watt |
| | R3 | 3.3 KΩ ¼ Watt |
| | R4 | 150 Ω ¼ Watt |
| | R5 | 100 Ω ¼ Watt |
| | R6 | 100 KΩ ¼ Watt |
| | R7 | 3.9 KΩ ¼ Watt |
| | R8 | 10 KΩ ¼ Watt |
| | R9 | .1 Ω 1 Watt |
| | R10 | 3.3K ¼ Watt |
| DIODES (D) | D1, D2, D3, D4 | Rectifier Diode or Bridge Package |
| | D5 | Zenor Diode .6-1 V |
| | D6 | Signal Diode in 4148 or Equivalent |
| TRANSISTORS (Q) | Q1, Q2 | NPN Small Signal |
| | Q3, Q4 | PNP Small Signal |
| | Q5 | NPN Power Transistor |
| VARIABLE RESISTORS (VR) | VR1 | 55K |
| | VR2 | 10K |
| CAPACITORS (C) | C1 | Ripple Filter - 2000 LF |
| | C2 | Delay - 10 KPF |
| SWITCH | SW1 | 2-Pole, 2-Way, Center Off |
| MOTOR | | DC - 3 V-12 V Motor. Current .5 to 2 AMP with reduction gear and fitting for socket or screwdriver bit. |
| POWER IN | | 12-18 V AC/DC, Non-Polar |
| FUSE | | 5 AMP |

What is claimed is:

1. A variable speed electric motor speed controller comprising:
   a. A bridge rectifier comprising a plurality of bridge diodes connected to a filter capacitor C1 for supplying power from a power source to an electric motor wherein the bridge rectifier maintains a constant polarity of power to the electric motor regardless of input polarity of power to the bridge rectifier;
   b. A first transistor Q1 that receives power from the bridge rectifier and is connected to a second transistor Q3 which is connected to a power transistor Q5 in emitter follower configuration;
   c. A load resisting sensor R9 connected to the motor and a Zenor Diode (D5) whereby in an idle motor condition the first transistor Q1 is forward biased by the power source and the second transistor Q3 conducts and amplifies current that is then fed through the load resisting sensor R9 to the motor and then back to the Zenor Diode D5 and to the emitter of the first transistor Q1 resulting in an output voltage of the motor equal to the voltage of the Zenor Diode D5 and results in the motor turning at minimum speed; and
   d. A first variable resistor VR1 wherein the first variable resistor VR1 is connected to the load resisting sensor R9 and monitors load increase to a third transistor Q4 which causes the transistor Q3 to conduct more power and thereby cause the motor speed to increase or decrease to match the applied load.

* * * * *